(12) United States Patent
Benz et al.

(10) Patent No.: US 6,558,446 B1
(45) Date of Patent: May 6, 2003

(54) IN SITU ELECTROSLAG REFINING HOT START

(75) Inventors: Mark Gilbert Benz, Burnt Hills, NY (US); William Thomas Carter, Jr., Galway, NY (US); Robert John Zabala, Schenectady, NY (US); Bruce Alan Knudsen, Amsterdam, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,815

(22) Filed: Oct. 22, 2001

(51) Int. Cl.[7] ............................................. C21B 11/10
(52) U.S. Cl. ..................... 75/10.24; 75/509; 266/201; 266/202
(58) Field of Search ................ 266/202, 201; 75/509, 10.24

(56) References Cited

U.S. PATENT DOCUMENTS

| | | | |
|---|---|---|---|
| 4,049,039 A | * 9/1977 | Grof et al. .................... | 164/52 |
| 5,160,532 A | 11/1992 | Benz et al. | |
| 5,310,165 A | 5/1994 | Benz et al. | |
| 5,325,906 A | 7/1994 | Benz et al. | |
| 5,332,197 A | 7/1994 | Benz et al. | |
| 5,348,566 A | 9/1994 | Sawyer et al. | |
| 5,366,206 A | 11/1994 | Sawyer et al. | |
| 5,985,206 A | * 11/1999 | Zabala et al. ................ | 266/202 |
| 6,097,750 A | * 8/2000 | Knudsen et al. ............. | 373/156 |

* cited by examiner

Primary Examiner—Scott Kastler
(74) Attorney, Agent, or Firm—Noreen C. Johnson; Christian G. Cabou

(57) ABSTRACT

An electroslag refining apparatus includes upper and lower integral crucibles, with the lower crucible having a drain. In situ hot start is effected by depositing in the lower crucible a pre-refined starter. The starter is melted in the lower crucible to form a starter pool, and slag is deposited atop the starter pool for being melted thereby to develop a slag pool thereatop. An ingot electrode is lowered through the upper crucible to immerse a tip thereof into the slag pool. The electrode is powered to effect resistance heating of the slag pool to melt the electrode tip. The slag and starter pools are increased in volume into the upper crucible, with the drain then being opened to effect steady state operation.

19 Claims, 3 Drawing Sheets

IN SITU ELECTROSLAG REFINING HOT START

BACKGROUND OF INVENTION

The present invention relates generally to electroslag refining, and, more specifically, to electroslag refining of superalloys.

Electroslag refining is a process used to melt and refine a wide range of alloys for removing various impurities therefrom, U.S. Pat. No. 5,160,532, Benz et al., discloses a basic electroslag refining apparatus over which the present invention is an improvement. Typical alloys which may be effectively refined using electroslag refining include those based on nickel, cobalt, zirconium, titanium, or iron. The initial, unrefined alloys are typically provided in the form of an ingot which has various defects or impurities which are desired to be removed during the refining process to enhance metallurgical properties thereof including oxide cleanliness, for example.

In a conventional electroslag apparatus, the ingot is connected to a power supply and defines an electrode which is suitably suspended in a water cooled crucible containing a suitable slag corresponding with the specific alloy being refined. The slag is heated by passing an electric current from the electrode through the slag into the crucible, and is maintained at a suitable high temperature for melting the lower end of the ingot electrode. As the electrode melts, a refining action takes place with oxide inclusions in the ingot melt being exposed to the liquid slag and dissolved therein. Droplets of the ingot melt, fall through the slag by gravity, and are collected in a liquid melt pool at the bottom of the crucible. The slag, therefore, effectively removes various impurities from the melt to effect refining thereof.

The refined melt may be extracted from the crucible by a conventional induction-heated, segmented, water-cooled copper guide tube. The refined melt extracted from the crucible in this manner provides an ideal liquid metal source for various solidification processes including, for example, powder atomization, spray deposition, investment casting, melt-spinning, strip casting, and slab casting.

In the exemplary electroslag apparatus introduced above, the crucible is conventionally water-cooled to form a solid slag skull on the surface thereof for bounding the liquid slag and preventing damage to the crucible itself as well as preventing contamination of the ingot melt from contact with the parent material of the crucible, which is typically copper. The bottom of the crucible typically includes a water-cooled, copper cold hearth against which a solid skull of the refined melt forms for maintaining the purity of the collected melt at the bottom of the crucible. A discharge guide tube below the hearth is also typically made of copper and is segmented and water-cooled for also allowing the formation of a solid skull of the refined melt for maintaining the purity of the melt as it is extracted from the crucible.

A plurality of water-cooled induction heating electrical conduits surround the guide tube for inductively heating the melt thereabove for controlling the discharge flow rate of the melt through the tube. In this way, the thickness of the skull formed around the discharge orifice in the guide tube may be controlled and suitably matched with melting of the ingot for obtaining a substantially steady state production of refined melt which is drained by gravity through the guide tube.

In order to achieve steady state operation of the electroslag refining apparatus, the apparatus must be suitably started without introducing undesirable contamination or impurities. In a conventional cold start method, a solid starter plate is fixed into position at the bottom of the crucible and above the discharge guide tube. The starter plate is formed of the same material as the ingot electrode except that it has been pre-refined and suitably machined for integral assembly into the electroslag refining apparatus. It is therefore relatively expensive and introduces additional complexity to the overall apparatus.

In order to effect a cold start, the electrode is positioned closely atop the starter plate, and conventional slag in particulate form is deposited atop the starter plate around the electrode. An electrical current is passed through the electrode to the starter plate and then through the atmosphere to cause an electrical arc to jump therebetween. The heat from the arc melts the surrounding solid slag. When sufficient slag is melted, the electrode is lowered into the slag to extinguish the arc, at which time power to the electrode effects direct resistance heating of the slag pool for increasing its temperature.

The heated slag pool then continues to melt the tip of the electrode and the starter plate until a hole is melted through the starter plate and liquid metal fills the crucible atop the guide tube. The hole through the starter plate enlarges until it reaches the outer perimeter of the plate, and resulting refined metal and slag skulls line the crucible and the guide tube. Steady state operation is reached when the rate of melting of the electrode and discharge flowrate from the guide tube are substantially equal.

Although the starter plate is initially formed of pre-refined metal, the electric arcing cold start introduces undesirable nitrides therefrom which are not removed by the electroslag refining process. If the starter plate melts too early during the startup process, unrefined metal or slag may flow through the guide tube causing undesirable impurities in the discharge stream.

Alternatively, the electroslag refining apparatus may be brought to steady state operation using a conventional hot start. In this procedure, slag is melted in an external furnace and deposited into the electroslag refining crucible to allow immediate resistance heating of the slag and corresponding melting of the electrode. However, a starter plate is still required to avoid transfer of undesirable slag through the guide tube. Although the undesirable nitrides are not introduced, the system is relatively more complex and expensive in view of the required external furnace, and the requirements of the pre-refined and machined expensive starter plate.

Accordingly, it is desired to provide an improved electroslag refining apparatus and method for in situ hot start thereof.

SUMMARY OF INVENTION

An electroslag refining apparatus includes upper and lower integral crucibles, with the lower crucible having a drain. In situ hot start is effected by depositing in the lower crucible a pre-refined starter. The starter is melted in the lower crucible to form a starter pool, and slag is deposited atop the starter pool for being melted thereby to develop a slag pool thereatop. An ingot electrode is lowered through the upper crucible to immerse a tip thereof into the slag pool. The electrode is powered to effect resistance heating of the slag pool to melt the electrode tip. The slag and starter pools are increased in volume into the upper crucible, with the drain then being opened to effect steady state operation.

BRIEF DESCRIPTION OF DRAWINGS

The invention, in accordance with preferred and exemplary embodiments, together with further objects and advantages thereof, is more particularly described in the following detailed description taken in conjunction with the accompanying drawings in which.

DETAILED DESCRIPTION

Figure 1:
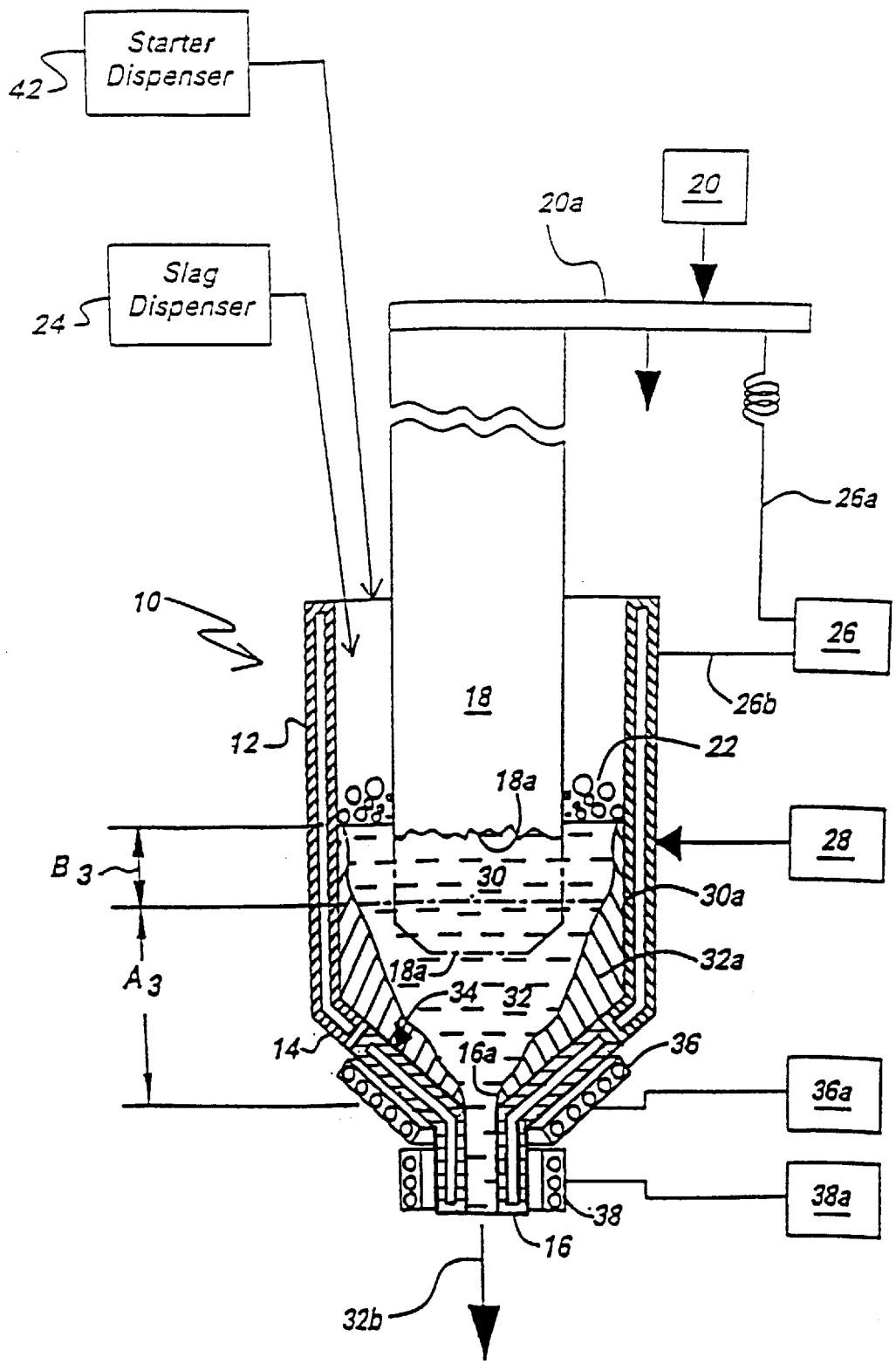
FIG. 1 is a schematic representation of an electroslag refining apparatus in accordance with an exemplary embodiment of the present invention for effecting in situ hot starting.
Figure 2:
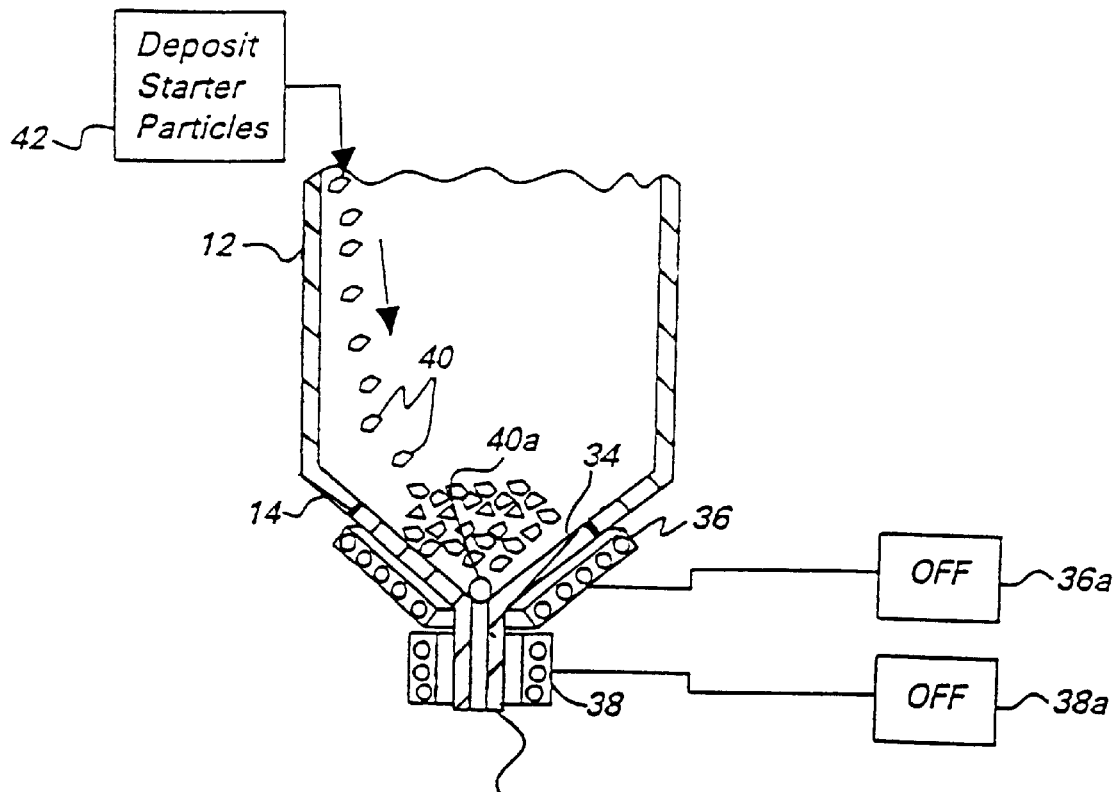
FIG. 2 is a schematic representation of upper and lower crucibles found in the apparatus illustrated in FIG. 1 in which hot starting is initiated using a pre-refined starter.

Illustrated schematically in FIG. 1 is an electroslag refining apparatus 10 in accordance with an exemplary embodiment of the present invention. The apparatus 10 includes a cylindrical upper crucible 12 and a conical lower crucible 14 extending integrally therebelow. The lower crucible 14 includes a central downspout or drain 16 extending downwardly.

Suitably suspended in the upper crucible 12 is an ingot 18 of a suitable alloy for undergoing electroslag refining. Conventional means 20 are provided for feeding or lowering the ingot 18 into the upper crucible 12 at a suitable feed rate. The lowering means 20 may have any suitable form including a drive motor and transmission rotating a screw, which in turn lowers or translates downwardly a support bar 20a fixedly joined at one end to the top of the ingot 18.

The ingot 18 is formed of any suitable alloy requiring electroslag refining such as nickel or cobalt based superalloys, for example. A suitable slag 22 is provided inside the crucible 12 and may take any conventional composition for refining a specific material of the ingot 18. A dispenser or means 24 is provided for depositing the slag 22 into the crucible 12, with the slag 22 taking the exemplary form of relatively small particles or nuggets. The slag dispenser 24 may take any conventional form including a chute for conveying the slag 22 into the crucible. If desired, the slag 22 may be manually inside the crucible 12.

The ingot 18 includes a tip 18a at its lower end, and conventional means 26 are provided for melting the ingot tip 18a as it is lowered and fed into the crucible 12. The tip melting means 26 is in the exemplary form of a suitable alternating or direct current power supply electrically joined to the ingot 18 through the support bar 20a by a suitable electrical lead 26a. Electrical current is carried through the ingot 18, which defines an electrode, and through the slag 22, in liquid form, to the crucible 12, with a return electrical lead 26b to the power supply. In this way, the means 26 are effective for powering the ingot electrode 18 to effect resistance heating of the slag 22 in its liquid form to a suitably high temperature to melt the electrode tip 18a suspended therein for consuming the electrode 18 as it is lowered during the electroslag refining process.

Suitable means 28 are provided for cooling the upper crucible 12, and a portion of the lower crucible 14, from the heat generated during the refining process. The upper and lower crucibles 12,14 may take any conventional form including hollow copper jackets disposed in flow communication with the cooling means 28 which circulate through the crucibles cooling water for removing heat therefrom. The cooling means 28 therefore include a suitable circulating pump and heat exchanger for removing heat as the water is circulated through the crucibles.

The slag 22 is initially in solid form and is initially melted in a startup process as described hereinbelow to develop a molten slag pool 30. The slag pool 30 undergoes resistance heating as electrical current passes from the electrode 18 through the slag pool 30 and to the crucible 12 in the electrical path to the powering means 26. The temperature of the slag pool 30 is thereby increased to melt the electrode tip 18a which forms a pool 32 of refined ingot material below the slag pool 30.

The refined pool 32 is denser than the slag pool 30, and as the ingot electrode 18 is consumed at its tip by melting thereof, the melt travels downwardly through the slag pool 30 which removes impurities therefrom for effecting electroslag refining, with the refined pool 32 accumulating the refined melt therein. Since the crucibles 12,14 are water cooled, corresponding slag and refined metal skulls 30a and 32a develop over the entire submerged inner surfaces of the crucibles to provide a continuous lining separating the copper crucibles from the refined melt pool 32 and slag pool 30. This prevents contamination of the refined pool 32 from the copper crucibles themselves.

The lower crucible 14 preferably includes a circumferentially segmented, water-cooled copper induction guide (CIG) tube 34 at the bottom thereof which includes the drain 16 for extracting or discharging the refined pool 32 therefrom as a molten melt stream 32b. The refined discharge stream 32b may then be used for any suitable application including, for example, powder atomization, spray deposition, investment casting, melt-spinning, strip casting, and slab casting.

The guide tube 34 is conventionally configured and water cooled so that the refined skull 32a extends downwardly through the drain 16 and defines an orifice 16a through which the melt stream 32b may be discharged without contamination from the copper guide tube 34 itself. The thickness of the skull 32a at the drain 16 may be controlled to control the size of the orifice 16a and in turn control the discharge flow rate of the melt stream 32b in a conventional manner.

More specifically, the guide tube 34 includes a plurality of circumferentially spaced apart guide fingers having a suitable electrical insulation therebetween. The fingers are preferably hollow for circulating cooling fluid such as water therethrough during operation. A first or upper induction heater 36 circumferentially surrounds the lower crucible 14 above the drain 16. And, a second or lower induction heater 38 circumferentially surrounds the drain 16 below the first heater 36. Both first and second induction heaters 36,38 are conventional in configuration and separately include respective pluralities of hollow electrically conducting tubes operatively joined to conventional first and second power supplies 36a and 38a.

The power supplies 36a,38a are effective for providing electrical current to the corresponding heaters 36,38 for inductively heating the melt pool 32 within the local area defined by the guide tube 34. The power supplies 36a,38a also include suitable means for circulating a cooling fluid such as water through the hollow induction tubes of the first and second heaters 36,38 for cooling the heaters themselves as well as providing additional cooling of the guide tube 34.

But for the present invention as described hereinbelow, the electroslag refining apparatus 10 described above is conventionally configured and operated for electroslag refining the ingot electrode 18 to produce the discharge stream 32b of refined metal for use as desired. The first and second induction heaters 36,38 are conventionally operated for controlling the local heating and cooling of the melt pool 32 above the guide tube 34, and correspondingly controlling the diameter of the drain orifice 16a to control discharge flow rate. However, in order to reach steady state operation of the apparatus 10, the apparatus 10 must be suitably started without introducing undesirable impurities which would degrade the resulting discharge stream 32b.

In accordance with the present invention, an improved method, and modification of the basic electroslag refining apparatus 10, are provided to effect in situ hot start of the apparatus 10 in a relatively simple and easily implemented method without the need for a conventional starter plate. The startup process may therefore be decreased in cost and complexity without introducing undesirable contamination.

More specifically, the improved method and apparatus for effecting hot starting of the refining apparatus 10 are illustrated schematically in FIGS. 2–5, with FIG. 1 illustrating the subsequent steady state operation of the apparatus 10. As initially illustrated in FIG. 2, the hot start method begins with the empty crucibles 12,14 in which a pre-refined starter 40 is initially deposited automatically or manually. The starter is preferably in the form of a plurality of loose, solid starter particles which are deposited and accumulate at the bottom of the lower crucible 14 above the drain 16.

The starter 40 is the same material as that found in the specific ingot electrode 18, and is preferably pre-refined. For example, the starter particles 40 may be recycled chips obtained as the scrap material from machining operations of previously refined metal. The chips are suitably cleaned to remove any undesirable surface contamination therefrom prior to being deposited in the lower crucible 14. The starter particles 40 may also be manufactured specifically for that purpose.

In this way, the additional expense and machining associated with a conventional starter plate are eliminated. And, the crucibles 12,14 may now be configured without mounts or flanges for supporting an integral starter plate now eliminated.

If desired, the drain 16 may be initially plugged by a specifically configured starter particle 40a in the form of a ball or sphere plug, for example, of suitably large diameter for preventing its passage through the drain 16. The starter particles 40 may be suitably deposited into the lower crucible 14 by a suitable dispenser or means 42 which deposits the starter particles 40 downwardly through the upper crucible 12 for accumulation in the lower crucible 14. The dispenser 42 may include a suitable chute for conveying the particles, which may be conveyed either automatically manually or if desired.

Figure 3:
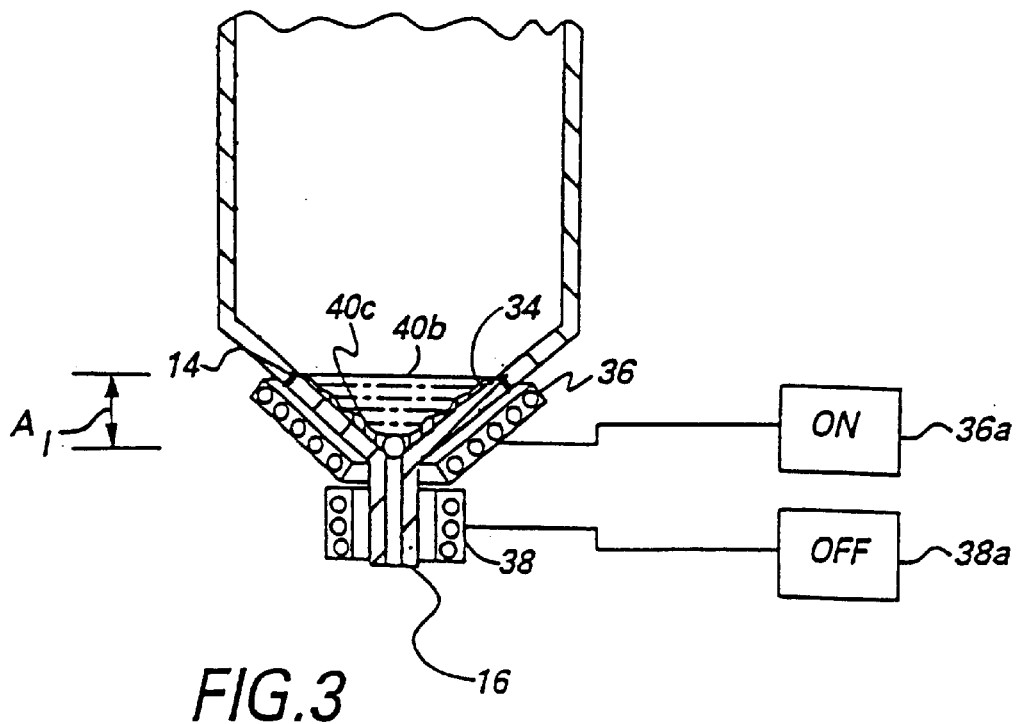
FIG. 3 is a view like FIG. 2 wherein the starter is melted by induction heating to form a starter pool.

In the next step illustrated in FIG. 3, the starter particles 40 are suitably melted in the lower crucible 14 to form a starter melt pool 40b. In this regard, the upper induction heater 36 may be electrically powered ON by its power supply 36a to inductively melt the starter particles 40 through the walls of the guide tube 34 to form the starter pool 40b. In the setup step illustrated in FIG. 2, both heaters 36,38 are preferably powered OFF, and in the initial melting step illustrated in FIG. 3, the upper heater 36 is powered ON, while the lower heater 38 remains powered OFF.

However, both power supplies 36a,38a are operated for circulating the cooling water through the respective heaters 36,38 for cooling thereof. The circulating coolant in the lower heater 38 is therefore effective for cooling the drain 16 for forming a solidified starter skull 40c atop the lower crucible 14 and over the drain 16 to restrain or prevent draining of the starter pool 40b therethrough.

Depending upon the heat input from the upper heater 36, the starter plug 40a may remain solid or may initially melt along with the other starter particles 40 until resolidification thereof occurs from contact with the cold walls of the guide tube 34. In either case, an effective starter skull 40c lines the upper surface of the guide tube 34 and prevents discharge of the starter pool 40b through the drain 16 during startup. Formation of the starter skull 40c has the additional advantage of preventing contamination of the starter pool 40b by the copper guide tube 34.

Since the starter material may now be provided in particle form in the preferred embodiment, the particles 40 may be introduced gradually within the melting ability of the upper heater 36. The induction heating effect of the upper heater 36 is confined to the conical region of the guide tube 34 bounded laterally and vertically by the heating coils of the upper heater 36. In this way localized heating of the starter particles 40 is effected for developing localized melting of the particles to initiate formation of the starter pool 40b.

As shown in FIG. 3, a sufficient amount of the starter particles 40 is initially deposited in the lower crucible 14 and melted by the upper heater 36 to form the starter pool 40b having a predetermined volume, and elevation or height $A_1$ atop the drain 16.

Figure 4:
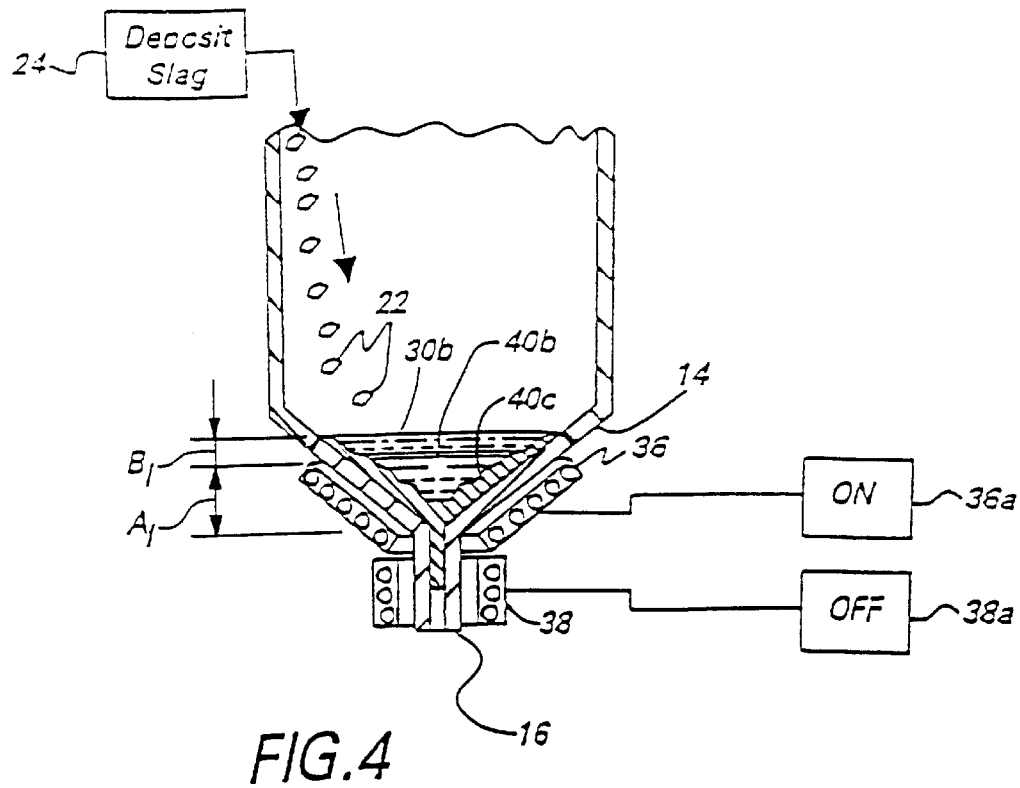
FIG. 4 is a view like FIG. 3 wherein slag is deposited atop the starter pool for being melted thereby to form a slag pool.

As shown in FIG. 4, the slag 22, preferably in particle form, is next deposited atop the starter pool 40b for being melted thereby to start the liquid slag pool 30b floating atop the starter particle pool 40b. This may be accomplished by using the slag dispenser 24 for dispensing the slag particles 22 downwardly through the upper crucible 12 and into the lower crucible 14 atop the starter pool.

The initial vertical height $A_1$ of the starter pool 40b is selected to prevent the deposited slag particles 22 from submerging through the starter pool and being entrapped adjacent to the drain 16. Since the slag particles 22 are relatively buoyant compared to the liquid starter pool 40b, a suitable initial height $A_1$ of the starter pool is quickly obtained, with corresponding solidified skulls of the starter and slag particles lining the inner surface of the lower crucible 14 as the starting process continues, until an initial volume or vertical height $B_1$ of the slag pool 30b is formed atop the starter pool 40b.

Figure 5:
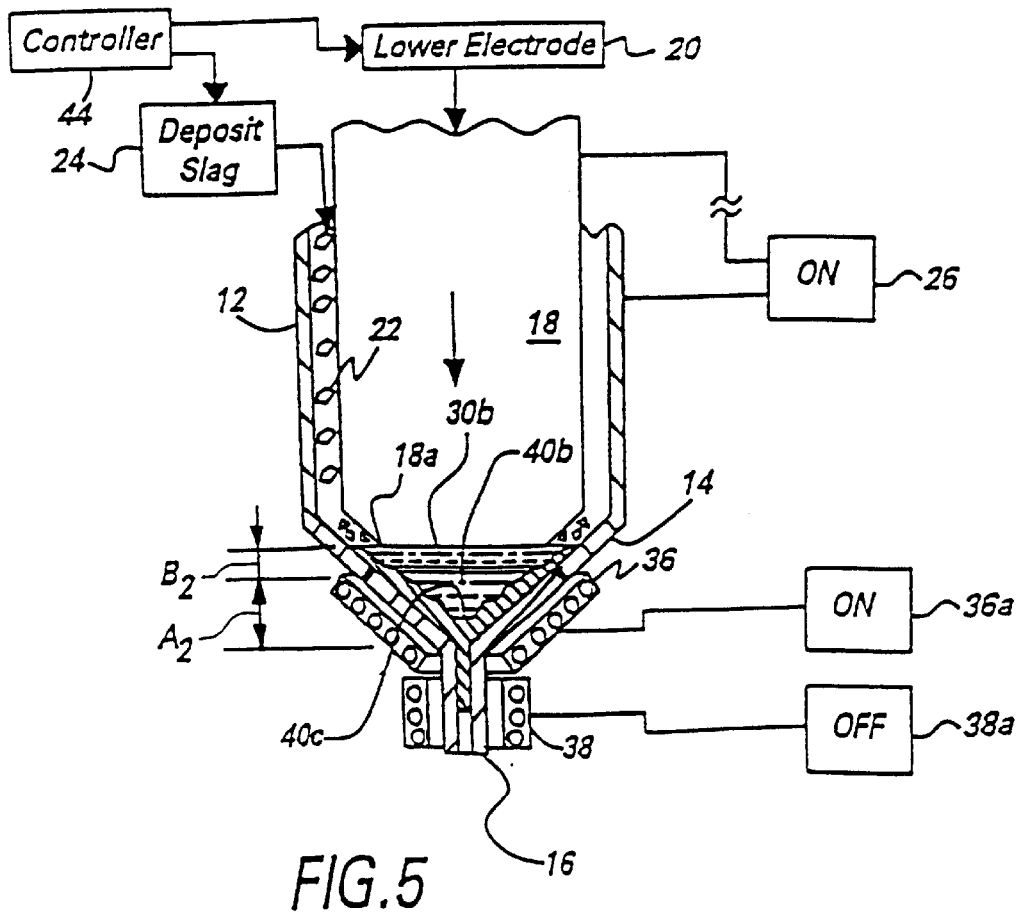
FIG. 5 is a view like FIG. 4 wherein an ingot electrode is lowered atop the slag pool for resistance heating thereof to increase the volumes of the starter and slag pools during hot starting.

As shown in FIG. 5, the ingot electrode 18 may then be lowered through the upper crucible 12 into the lower crucible 14 to immerse the electrode tip 18a into the developing slag pool 30b. The powering means 26 are then powered ON for powering the electrode 18 to effect resistance heating of the slag pool to melt the electrode tip 18a to thereby continue the hot start process by adding melt from the electrode 18 to the developing starter pool 40b. Conventional resistance heating of the slag pool then takes over from the induction heating provided by the upper heater 36 to continue the in situ hot start operation.

By continuing depositing slag 22 and lowering the electrode 18, the respective volumes of the slag and starter pools 30,32 are increased, with the respective vertical height $B_2,A_2$ rising upwardly into the upper crucible 12. A suitable electrical controller 44 may be operatively joined to the lowering means 20 and the slag dispenser 24 for coordinating depositing of the slag particles 22 and lowering of the electrode 18 for increasing the respective heights of the slag and starter pools.

The additional melted slag 22 is added to the slag starter pool to eventually define the steady state slag pool 30 having a suitable volume and vertical height $B_3$ as illustrated in FIG. 1. And, the addition of molten metal from the ingot electrode 18 to the starter pool increases the volume thereof to define the resulting melt pool 32 having a suitable steady state vertical height $A_3$ as illustrated in FIG. 1. The corresponding skulls 30a and 32a grow to completely line the submerged portions of the upper and lower crucibles 12,14 around the respective pools 30,32.

In this way, both the starter particles 40 and slag particles 22 are introduced in small volumes in the lower crucible 14 and suitably heated firstly by the upper induction heater 36 and then by resistance heating through the electrode 18 to develop and grow the respective slag and melt pools. The corresponding skulls also develop along the inner surfaces of the crucibles 12,14 for preventing contamination of the refined melt pool 32 from the copper crucibles.

The powering means 26 may be further operated to additionally heat the slag pool 30 using resistance heating to a suitable temperature, having superheat for example, so that with suitable volumes of the slag and melt pools 30,32, steady state operation of the electroslag refining apparatus 10 may begin.

Accordingly, after the slag and starter pools have suitably risen into the upper crucible 12, the drain 16 may be suitably opened to discharge therefrom the melt stream 32b as illustrated in FIG. 1. The drain 16 is preferably opened by induction heating the starter skull 40c atop the drain 16 to melt the starter skull 40c for forming the drain orifice 16a therein for discharging by gravity the melt stream 32b. The first and second induction heaters 36,38 are separate and independent for separately controlling heating and cooling within the corresponding portions of the guide tube 34. In this way, the respective skulls formed along the inner surfaces of the guide tube 34 may be controlled.

The upper induction heater 36 is specifically configured in accordance with the present invention to have a suitable vertical extent along the guide tube 34 for initially melting the starter particles 40 for effecting a suitably high starter pool 40b. Because of this additional function, the vertical extent of the upper heater 36 is greater than that in a conventional heater that is not used for starting. The upper heater 36 is otherwise conventionally used during steady state operation for controlling the local heating of the melt above the guide tube 34 and controlling the thickness of the refined skull 32a. And, the lower heater 38 may be conventionally configured and operated for steady state operation. And for hot start, it is preferably powered OFF, and provides solely internal cooling through the hollow conduits thereof for maintaining closed the drain 16 as the slag and starter pools accumulate in volume and height.

The modifications to the electroslag refining apparatus 10 disclosed above now enable that apparatus to effect in situ hot starting without the need for the conventional solid disk, machined starter plate, or arc heating to melt the slag, or an external furnace therefor. The starter material is now independent from the refining apparatus itself, and does not form a part thereof. Instead, the starter material is merely a consumable element, and in simple particle form allows continuous formation of the starter pool with a corresponding protective skull lining to prevent contamination thereof. Upon reaching steady state, the melt pool 32 may be suitably discharged through the drain 16 for conventional use as desired.

As illustrated in FIG. 1, the ingot electrode 18 is preferably in cylindrical form and has a maximum outer diameter for fitting within the available space in the upper crucible 12. Since the lower crucible 14 is preferably conical, the use of a conventional cylindrical ingot electrode 18 is not desirable since it may prematurely contact the inner surface of the lower crucible 14 as it is lowered for hot starting.

Accordingly, in accordance with another feature of the present invention, the electrode tip 18a as illustrated in phantom in FIG. 1 and in solid line in FIG. 5, is initially sized and configured to maintain a suitable horizontal and vertical clearance between the tip 18a and the lower crucible 14 during startup immersion of the tip 18a into the starter pool 40b. The electrode 18 therefore preferably decreases in size or outer diameter toward the tip 18a to closely match the size or diameter of the developing slag pool 30b in the lower crucible 14 during startup immersion as illustrated in FIG. 5. The preferred configuration of the electrode tip 18a before it is consumed, therefore preferably matches both the configuration of the lower crucible 14 and developing slag pool 30b therein for maintaining a suitable clearance around the circumference of the electrode 18 in the lower crucible 14 for preventing undesirable contact therewith.

The electrode tip 18a should preferably contact only the slag pool 30b during immersion so that it may be melted by the slag pool 30b and add to the volume of the starter pool 40b. Once the slag pool 30b exceeds the elevation of the transition between the conical lower crucible 14 and the cylindrical upper crucible 12, the ingot electrode 18 may have its maximum outer diameter to maximize melt production since the shape of the tip 18a thereof is no longer relevant after the initial in situ hot starting.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method for starting an electroslag refining apparatus including upper and lower integral crucibles, with said lower crucible having a drain, said method comprising:
   depositing in said lower crucible a pre-refined starter;
   melting said starter by induction heating in said lower crucible to form a starter pool;
   depositing slag atop said starter pool for being melted thereby to develop a slag pool atop said starter pool;
   lowering an ingot electrode through said upper crucible to immerse a tip thereof into said slag pool;
   powering said electrode to effect resistance heating of said slag pool to melt said electrode tip; and
   continuing depositing said slag and lowering said electrode to increase volumes of said slag and starter pools upwardly into said upper crucible.

2. A method according to claim 1 wherein:
   said slag includes slag particles; and
   said starter includes starter particles melted to form said starter pool having an initial height selected to prevent said deposited slag particles from submerging through said starter pool and being entrapped adjacent said drain.

3. A method according to claim 1 wherein said electrode is lowered through said upper crucible into said lower crucible to initially immerse said tip into said slag pool while maintaining a clearance between said tip and said lower crucible.

4. A method according to claim 3 wherein said electrode decreases in size toward said tip to match size with said slag pool in said lower crucible during said initial immersion.

5. A method according to claims 1 further comprising forming a starter skull atop said lower crucible and over said drain to restrain draining of said starter pool therethrough.

6. A method according to claim 5 further comprising cooling said drain to solidify from said starter pool said starter skull to line said lower crucible atop said drain.

7. A method according to claim 6 further comprising opening said drain upon said slag and starter pools rising into said upper crucible to discharge therefrom a melt stream refined from said electrode.

8. A method according to claim 7 wherein said drain is opened by induction heating said starter skull at said drain to melt said skull for discharge therethrough as said melt stream.

9. A method according to claim 8 wherein said induction heating at said drain and at said lower crucible are independent.

10. An electroslag refining apparatus comprising:

upper and lower integral crucibles, with said lower crucible having a drain;

means for depositing in said lower crucible a starter of pre-refined metal;

means for melting said starter in said lower crucible to form a starter pool, where said melting means comprises a first induction heater surrounding said lower crucible to melt said starter;

means for depositing slag atop said starter pool for being melted thereby to develop a slag pool atop said starter pool;

means for lowering an ingot electrode through said upper crucible to immerse a tip thereof into said slag pool;

means for powering said electrode to effect resistance heating of said slag pool to melt said electrode tip; and wherein said slag depositing means and electrode lowering means are configured to continue depositing said slag and lowering said electrode to increase volumes of said slag and starter pools upwardly into said upper crucible.

11. An apparatus according to claim 10 further comprising means for forming a starter skull atop said lower crucible and over said drain to restrain draining of said starter pool therethrough.

12. An apparatus according to claim 11 further comprising means for cooling said drain to solidify from said starter pool said starter skull to line said lower crucible atop said drain.

13. An apparatus according to claim 12 further comprising means for opening said drain upon said slag and starter pools rising into said upper crucible to discharge therefrom a melt stream refined from said electrode.

14. An apparatus according to claim 13 further comprising a second induction heater surrounding said drain for induction heating said starter skull at said drain to melt said skull for discharge therethrough as said melt stream.

15. An apparatus according to claim 14 wherein said first and second induction heaters are separate and independent.

16. An apparatus according to claim 15 wherein:

said lower crucible is conical; and said electrode decreases in size toward said tip to match size with said slag pool in said lower crucible during said initial immersion.

17. An apparatus according to claim 16 wherein said electrode tip is conical to maintain a clearance with said conical lower crucible.

18. An apparatus according to claim 15 wherein said first induction heater extends upwardly along said lower crucible above said drain to form said starter pool having an initial height selected to prevent said deposited slag particles from submerging through said starter pool and being entrapped adjacent said drain.

19. An electroslag refining apparatus comprising:

upper and lower integral crucibles, with said lower crucible having a drain;

means for depositing in said lower crucible a starter of pre-refined metal;

means for melting said starter in said lower crucible to form a starter pool;

means for depositing slag atop said starter pool for being melted thereby to develop a slag pool atop said starter pool;

means for lowering an ingot electrode through said upper crucible 12 to immerse a tip thereof into said slag pool;

means for powering said electrode to effect resistance heating of said slag pool to melt said electrode tip; and wherein said slag depositing means and electrode lowering means are configured to continue depositing said slag and lowering said electrode to increase volumes of said slag and starter pools upwardly into said upper crucible.

* * * * *